United States Patent
Yamamoto

(10) Patent No.: US 7,734,798 B2
(45) Date of Patent: Jun. 8, 2010

(54) DATA CONVERSION RULE SWITCHING DEVICE

(75) Inventor: Takao Yamamoto, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1039 days.

(21) Appl. No.: 10/821,297

(22) Filed: Apr. 8, 2004

(65) Prior Publication Data
US 2004/0215801 A1  Oct. 28, 2004

(30) Foreign Application Priority Data
Apr. 9, 2003  (JP) .............................. 2003-105288

(51) Int. Cl.
*G06F 15/16* (2006.01)
*G06F 15/173* (2006.01)
(52) U.S. Cl. ...................................... 709/230; 709/223
(58) Field of Classification Search ................. 709/203, 709/217, 223–225, 230
See application file for complete search history.

(56) References Cited

U.S. PATENT DOCUMENTS

| 5,204,768 | A  | * | 4/1993  | Tsakiris et al. | ............... 398/107 |
| 5,872,562 | A  |   | 2/1999  | McConnell et al. | |
| 6,421,069 | B1 | * | 7/2002  | Ludtke et al. | ............... 715/762 |
| 6,505,245 | B1 | * | 1/2003  | North et al. | .................. 709/223 |
| 6,836,796 | B2 | * | 12/2004 | Schwartz et al. | ............ 709/223 |
| 6,859,835 | B1 | * | 2/2005  | Hipp | ........................... 709/227 |
| 6,920,614 | B1 | * | 7/2005  | Schindler et al. | ............ 715/726 |
| 7,287,077 | B2 | * | 10/2007 | Haugh et al. | ................. 709/225 |
| 7,433,955 | B2 | * | 10/2008 | Block et al. | .................. 709/227 |
| 2002/0059372 | A1 |   | 5/2002 | Goshev et al. | |

FOREIGN PATENT DOCUMENTS

| JP | 2-306353   | 12/1990 |
| JP | 9-319476   | 12/1997 |
| JP | 09-319476  | 12/1997 |

OTHER PUBLICATIONS

Printing Under Unix, Internet Article, Anonymous, Online!, Feb. 14, 2003.
CT Magazine Fuer Computer Technik, Verlag Heinz Heise GMBH, Hannover, DE, Aug. 17, 1998, pp. 190-195.
Unix System Administration Handbook, Evi Nemeth, et al., Oct. 1, 1998, Prentice Hall, USA.
CT Magazine Fuer Computer Technik, Verlag Heinz Heise GMBH, Hannover, DE, Nov. 1998, pp. 164-170.
Newton, H. (Feb. 2001). Definition of "Port", *Newton's Telecom Dictionary*, CMP Books: New York, NY, pp. 539-540.
Newton, H. (Feb. 2001). Definitions of "Protocol" to "Protocols", *Newton's Telecom Dictionary*, CMP Books: New York, NY, pp. 553-554.

* cited by examiner

*Primary Examiner*—Hussein Elchanti
(74) *Attorney, Agent, or Firm*—Morrison & Foerster LLP

(57) ABSTRACT

In a data conversion rule switching device, a data conversion rule suitable for control of a target device assigned to a data communication port is set for each of a plurality of data communication ports. When a data communication port to be used is selected, operation data corresponding to operation of a plurality of controls provided outside or inside the data conversion rule switching device and generated in response to the operation is converted into an operation data suitable for control of the target device in accordance with the data conversion rule set for the selected data communication port, and the converted operation data is sent to the selected data communication port.

4 Claims, 3 Drawing Sheets

F I G. 1
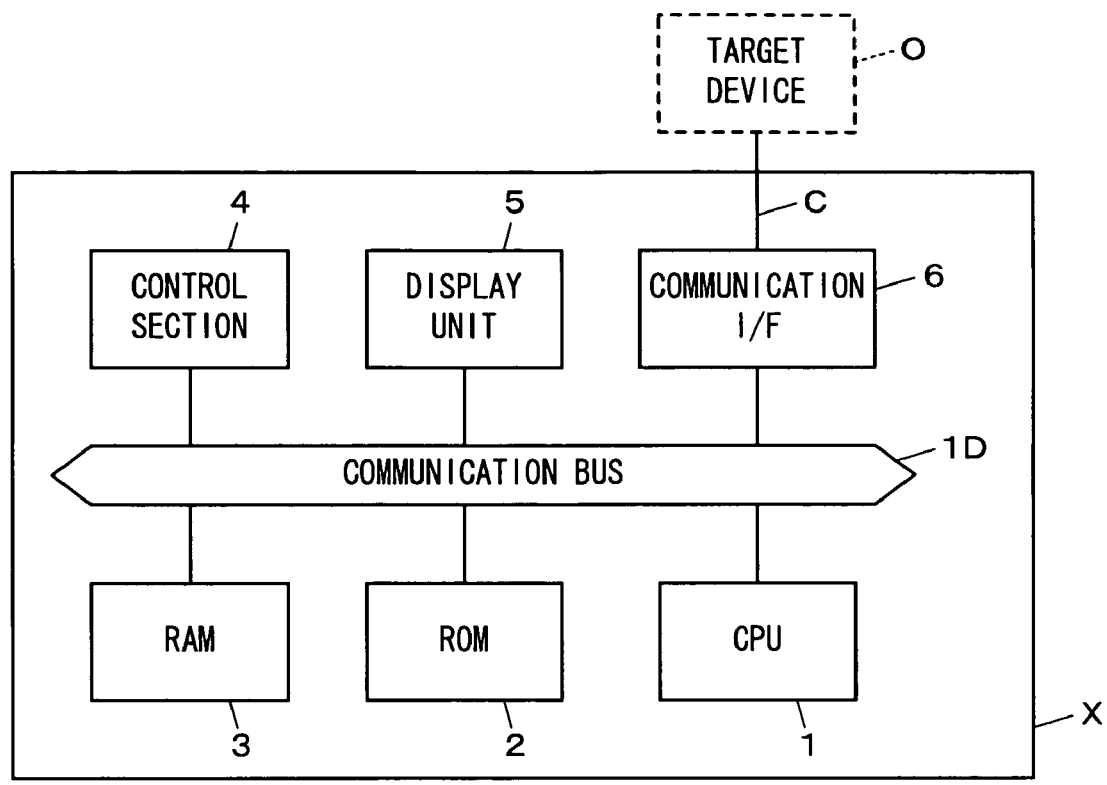

DATA CONVERSION RULE SWITCHING DEVICE

BACKGROUND OF THE INVENTION

1. Field of the Invention

The invention relates to a data conversion rule switching device for switching to a data conversion rule suitable for control of respective target devices, so that a plurality of target devices connected to respective data communication ports (data communication paths) can be controlled with a single control device while changing the target device, a method of switching data conversion rules, and a program for the switching. More specifically, the invention relates to a data conversion rule switching device, method of switching data conversing rules, and program for realizing an easy switching of data conversion rules.

2. Description of the Related Art

Conventionally, a single control device which controls a plurality of target devices has been known. For example, Japanese Patent Laid-Open Publication No. H09-319476 discloses an invention that a plurality of personal computers (corresponding to the target devices) are respectively connected via a connecting cable to a control device (i.e., so-called "remote controller") comprised of a keyboard, a mouse and, a display, and one personal computer to be controlled with the control device can be selected.

The control device operates such that when a control such as a keyboard and a mouse is operated, the control device sends operation data generated in response to operation of the control only to a connection cable that provides connection with the selected personal computer. Thus, a user can control each of the personal computers through use of a single control device while switching the target device between the plurality of personal computers connected to the control device, wherein the control includes, for example, file transfer between the respective personal computers and activation/control of a software program stored in each of the personal computers.

The operation data for control of personal computer is in a data format common to the respective personal computers. Accordingly, in this case, even when a personal computer to be controlled is switched from one to another, the operation data generated in response to the operation of the control does not need to be converted into a data format suitable for control of the selected target device, and therefore switching between a plurality of data conversion rules (referred to also as "protocols" in this specification) is not performed.

Furthermore, an example of a single control device capable of controlling a plurality of target devices is, for instance, configured so that various different types of mixers can be controlled through use of the single control device by connecting the mixers (including not only a mixing device comprised of a dedicated hardware but a software program or the like stored in a personal computer for realizing functions of a mixer) to the single control device while changing from one to another.

In such an example, the mixer is controlled by operation data generated in response to operation of controls of the control device and therefore a data conversion rule (protocol) needs to be switched depending on what type of mixer is connected to the control device. For this reason, conventionally, a data conversion rule corresponding to the type of a mixer connected to the control device is previously selected from among data conversion rules previously prepared for mixers of different types and assigned to the control device, and then, the operation data is converted in accordance with the assigned data conversion rule so that the mixer connected to the control device can be controlled.

As described above, when a single control device is configured to control a plurality of target devices, the data conversion rule (protocol) needs to be switched to one suitable for use in each of the target devices in order to allow the control device to control different types of target devices. Since the conventional control device is configured to use only one type of data conversion rule, a user had to elaborately switch from one data conversion rule to another data conversion rule suitable for a newly selected target device by himself/herself, each time when a target device is changed from one to another. As described above, it was so problematic, troublesome and time-consuming for a user to perform an additional operation to switch a data conversion rule from one to another whenever a type of target device to be controlled is changed from one to another.

SUMMARY OF THE INVENTION

The present invention has been conceived in consideration of the above-mentioned problems, and it is an object of the invention to provide a data conversion rule switching device which realizes an automatic switching of a data conversion rule (protocol) to a desired conversion rule suitable for use in each of target devices simply by switching data communication ports (data communication paths) to which target devices are connected, allowing a user to easily control respective target device connected to the data communication ports through use of a single control device while performing switching between the respective target devices, and further, to provide a method of switching data conversion rules and a program for realizing such a switching.

The data conversion rule switching device according to the invention is a data conversion rule switching device for switching data conversion rules in accordance with a target device in order to respectively control a plurality of target devices in response to operation of a plurality of controls provided outside or inside the data conversion rule switching device, and the data conversion rule switching device includes: a plurality of data communication ports for externally connecting with the plurality of target devices and transmitting operation data corresponding to operation of the plurality of controls and generated in response to the operation to the plurality of target devices; an assign or for assigning plurality of data communication ports one by one to each of the plurality of target devices, respectively; a setter for setting a data conversion rule suitable for control of the target device assigned to the data communication port, for each of the plurality of data communication ports; a selector for selecting a desired data communication port from among the plurality of data communication ports; a converter for converting operation data corresponding to operation of the plurality of controls and generated in response to the operation in accordance with the data conversion rule set for the selected data communication port; and a sender for sending the converted operation data to the selected data communication port.

According to the invention, simply selecting a data communication port to be utilized from among the plurality of data communication ports allows a user to control a plurality of target devices which are assigned to the respective data communication ports in response to operation of a plurality of controls provided outside or inside the switching device. That is, the plurality of target devices are externally connected to the switching device, and one of the plurality of data communication ports provided to transmit operation data corresponding to operation of the plurality of controls and generated in response to the operation to the plurality of target devices is assigned to each one of the plurality of target devices. Furthermore, a data conversion rule suitable for control of the target device assigned to the data communication port is set for each of the plurality of data communication ports. When a desired data communication port is selected from among the plurality of data communication ports and the plurality of controls provided inside or outside the switching device are operated, operation data corresponding to operation of the plurality of controls and generated in response to the operation is converted into operation data in a format suitable for control of the target devices in accordance with the data conversion rule set for the data communication port, and the converted operation data is sent to the data communication port.

Accordingly, a user needs not to be aware of switching to the data conversion rule (protocol) suitable for control of the target device, and a user can easily control respective target devices connected to the respective data communication ports through use of the plurality of controls provided inside or outside the switching device while changing control target device, by just switching between the data communication ports to which the target devices are assigned.

The data conversion rule switching device may preferably be configured so that the switching device further includes a detector for detecting the data communication port selected by the selector, and the conversion of the operation data by the converter and the sending of the converted operation data to the data communication port by the sender are performed for all of the detected data communication port.

Further, it is preferable that the respective target devices are devices in which software is activated and the control in response to operation of the plurality of controls is control on operation of the software.

Moreover, the data conversion rule switching device may be configured so that the respective target devices can be connected to the switching device via a physically single cable and the converted operation data is transmitted to the respective target devices via the cable.

Additionally, the invention can be configured and exploited as a method invention as well as a device invention. Moreover, the invention can be exploited in a form of a program executed by a processor such as a computer or a DSP (digital signal processor) and also in a form of a recording medium storing such program.

The above and other objects, features and advantages of the invention will be apparent from the following detailed description which is to be read in conjunction with the accompanying drawings.

BRIEF DESCRIPTION OF DRAWINGS

FIG. 1 is a hardware configuration block diagram showing a control device (controller) which is an embodiment of a data conversion rule switching device according to the invention;

DETAILED DESCRIPTION OF THE PREFERRED EMBODIMENTS

Figure 2:
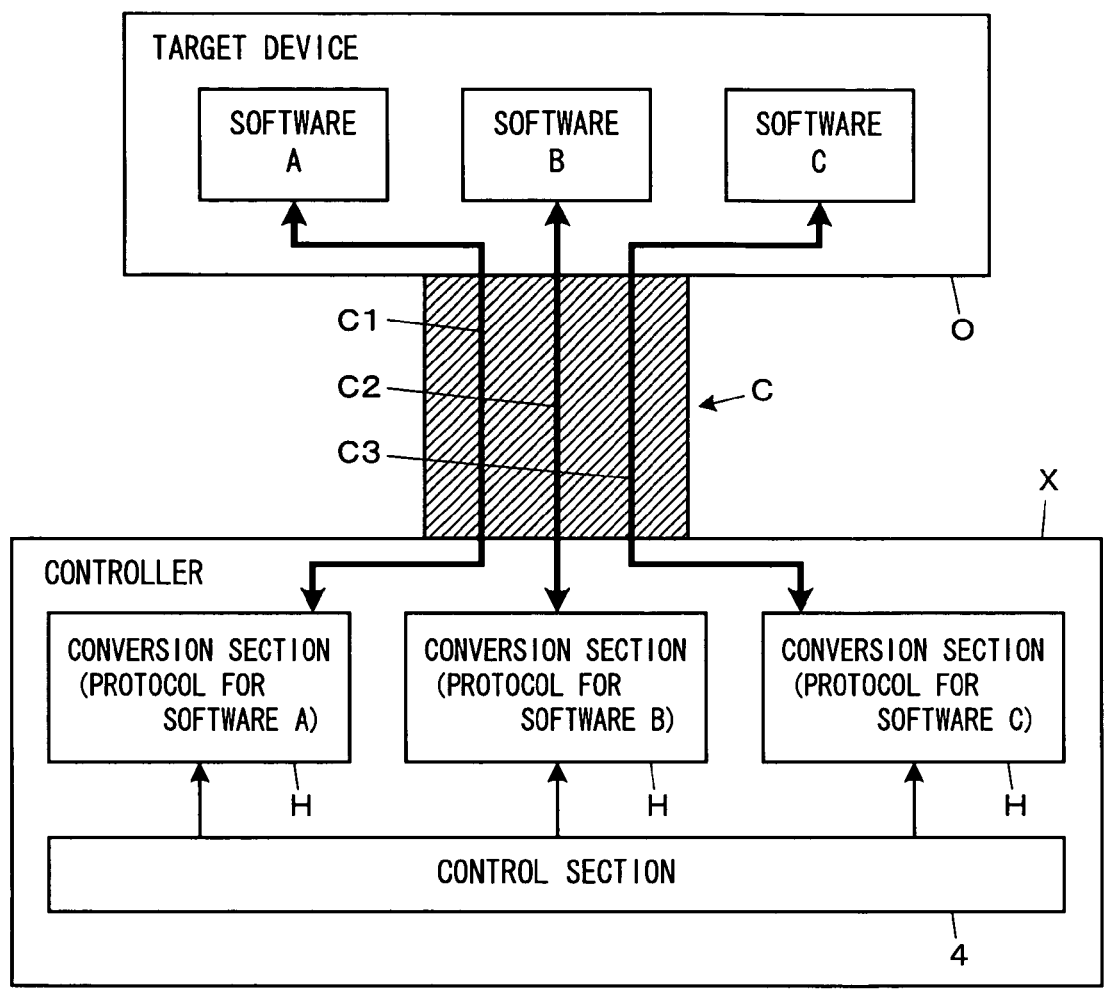
FIG. 2 is a conceptual diagram to explain how the controller performs control on the target device.

Hereinafter, a preferred embodiment of the invention will be explained in detail with reference to the attached drawings.

FIG. 1 is a hardware configuration block diagram illustrating an embodiment of a data conversion rule switching device according to the invention. The data conversion rule switching device (hereinafter, the device is referred to as a controller X) is a remote controller incorporating a control section 4 therein and configured to instruct a suitable target device O connected to a communication interface 6 via a connection cable C to operate in response to operation at the control section 4 on the side of the controller X.

An example of the hardware configuration of the controller X shown in FIG. 1 comprises a computer which performs processing for controlling the target device O in response to the operation at the control section 4 by executing specific control program for realizing "data conversion rule switching processing." In the "data conversion rule switching processing," which is later described in detail (refer to FIG. 3), operation data corresponding to the content of operation of various controls constituting the control section 4 is converted in accordance with a predetermined data conversion rule (protocol), and the converted operation data is sent to a predetermined communication port (data communication path for transmission/reception of data) included within the connection cable C. By adopting such processing, the target device O can be controlled through use of the controller X.

Needless to say, such "data conversion rule switching processing" can be carried out in a form of a microprogram processed by a DSP (digital signal processor) as well as computer software, and alternatively, in stead of using the program of such type, the processing may be carried out using a dedicated hardware device constituted including discrete circuits, integrated circuits, large scale integrated circuits or the like. Furthermore, data format conversion according to the data conversion rule is performed by the data conversion function of the controller X. Similarly to the above described case, the function can also be realized using programs, integrated circuits or the like.

The controller X shown in this embodiment is controlled by a microcomputer comprising a microprocessor unit (CPU) 1, a read only memory (ROM) 2, and a random access memory (RAM) 3.

Moreover, the CPU 1 controls various operations within the controller X by executing software including a predetermined control program. The ROM 2, the RAM 3, a control section 4, a display unit 5 and a communication interface (I/F) 6 are connected to the CPU 1 having such functions via the communication bus (for example, a data and address bus, etc.) 1D.

The ROM 2 is a memory that stores various control programs, various data, and the like executed or referred by the CPU 1. The RAM 3 is a memory used as a working memory for temporarily storing various data, etc., generated when the CPU 1 executes a predetermined program, a memory for storing a program being currently executed and data associated with the program, or the like. Predetermined address areas in the RAM 3 are assigned to individual functions of the CPU 1 and utilized as a register, flag, table, memory and the like.

The control section 4 includes, for example, a protocol change switch for changing assignment of data conversion rules (protocols) to conversion sections (refer to later-described FIG. 2), a communication port selection switch for selecting and switching the data communication ports (data communication paths), and a stop switch for instructing to stop control from the controller X. Furthermore, the control section 4 includes various controls for generating operation data in response to operations thereof to control the target device O connected to the controller X, for example, a slider (also called a fader) used to adjust sound level, a mute switch used to perform setting of mute, and an assignment switch used to assign audio signals to respective input/output channels.

Needless to say, other than the above-stated controls, the control section 4 may include various controls such as a numeric keypad for input of numeric data, a keyboard for input of character data, and/or a mouse for operating a specific pointing device displayed on the display unit 5.

The display unit 5 is a display composed of, for example, a liquid crystal display panel (LCD), a cathode ray tube (CRT) or the like, which displays a list of status indicating how data conversion rules are being assigned to respective communication ports and/or various information about how the CPU 1 are performing control.

The communication interface (I/F) 6 is an interface which enables connection between the controller X and the target device O via the connection cable C, thereby enabling to transmit operation data generated in response to operation of the control section 4 within the controller X to the target device O. The connection cable C is composed of a physically single cable and provided with a plurality of data communication ports as data communication paths for data transmission/reception.

Furthermore, the target devices can be connected externally to each of the plurality of data communication ports, and each of the data communication ports independently allows various data such as operation data generated in response to operation of the control section 4 to be transmitted to and received from the target devices externally connected to the controller. The target device O would be various devices such as a personal computer, mixer and sequencer, and is an external device for performing various operations in response to specific operation data.

It should be noted that as will be described later, the communication interface 6 is also used to download various programs, various data, and the like to the controller X from a server computer connected to the controller X via a communication network.

It should be appreciated that even in a case where control programs are not stored in the ROM 2, if control programs, data, and the like stored in an external storage device (not shown) such as a hard disk drive are read into the RAM 3, or the controller X is connected to a server computer via a communication network and control programs, data, and the like is downloaded from the server, CPU 1 can operate as in the case where control programs, data, and the like are stored in the ROM 2. When such a configuration is adopted, new control programs are easily added to current programs and/or current programs are easily updated to a new version.

It should be noted that the external storage device is not limited to a hard disk drive (HDD), but may be any storage device which employs removable and external storage media constructed in various forms, such as a flexible disk (FD), compact disk (CD-ROM, CD-RAM), optical magnetic disk (MO), or digital versatile disk (DVD). Alternatively, it may be a semiconductor memory.

As described above, the controller X shown in this embodiment is a remote controller configured such that the operation data corresponding to operation of the various controls within the control section 4 and generated in response to the operation is transmitted to the target device O via the communication interface 6 and the connection cable C in order to perform control on the target device O. Then, a general explanation of how the controller X performs control on the target device O will be made with reference to FIG. 2.

FIG. 2 is a conceptual diagram to explain how the controller X performs control on the target device O. Note that in this embodiment, the explanation will be made taking an example where operations of a plurality of sound control software programs which are incorporated within the target device O are controlled by operating the control section 4 of the controller X while performing switching between the plurality of sound control software programs. Also note that even if the target device O is a physically single device, it could be considered that as shown in FIG. 2, when the plurality of software programs are executed within the target device O and operation of the individual software programs can be controlled by the controller X, a plurality of target devices are present independently from one another so as to correspond respectively to the plurality of software programs to be controlled.

The target device O shown in FIG. 2 would be various devices such as a personal computer, mixer and sequencer, which are configured to initiate various functions in response to activation of various control programs previously stored in the device. Controls such as a keyboard and mouse are connected to the target device O, and regardless of whether or not the controller X is connected to the target device O, it is possible to conduct instruction on the control programs stored in the target device O using those controls.

When the controller X is used to control the target device O, programs to be controlled by the controller X are activated in advance in the target device O. For example, when a user wants to generate controlled musical sound on the side of the target device O in response to operation on the controller X, the user should activate a plurality of sound control software programs (hereinafter, such control programs are described simply as software) previously stored in the target device O in advance.

Thereafter, from which data communication ports C1 to C3 within the connection cable C the software receives operation data is determined individually for the respective activated software. That is, the connection cable C used to connect the controller X and the target device O is provided therein a plurality of data communication ports (in this embodiment, three data communication ports C1 to C3), and those data communication ports C1 to C3 independently allow data communication between the controller X and the target device O. Thus, when the data communication ports C1 to C3 are assigned to the individual software activated in the target device O, the controller X can transmit operation data to the respective software, which perform control tasks in response to the received operation data. The assignment is performed by the CPU 1 serving as assignor automatically or in accordance with instruction from a user.

On the other hand, in response to operation of the respective controls in the control section 4, the controller X performs assignment of data conversion rules to conversion sections H, switching between the data communication ports C1 to C3 to be used, and instruction (remote control) for the software to be controlled regardless of whether or not the target device O is connected to the controller X.

The controller X is provided with the conversion sections H corresponding to the respective data communication ports C1 to C3 which are available and provided within the connection cable C, and a user can appropriately assign the data conversion rules (protocols) to the individual conversion sections H. In this embodiment, a protocol for software A is assigned to the conversion section H corresponding to the data communication port C1, a protocol for software B is assigned to the conversion section H corresponding to the data communication port C2, and a protocol for software C is assigned to the conversion section H corresponding to the data communication port C3.

Examples of the contents of the data conversion rules (protocols) to be assigned to the respective data communication ports C1 to C3 include a conversion rule for a data format, a type of a parameter for sound control that is to be generated corresponding to each of the controls, the magnitude of a parameter for sound control to be generated in accordance with manipulation degree of the control. The data conversion rule is typically determined for each of the software and previously prepared for each of the software.

Accordingly, when data conversion rule that should not be applied to the target software is used to instruct the target software to perform control tasks, the target software is in no way controlled or a parameter whose type is different from that of the parameter that a user intended to adjust is controlled, or control tasks are performed using the magnitude different from the one that a user intended to achieve. To prevent occurrence of the above-stated unfavorable events, a data conversion rule suitable for target software needs to be employed. Therefore, switching between the data communication ports C1 to C3 to be used is performed by allowing the controller X to select software to be controlled from among a plurality of software being already activated on the side of the target device O and then determining any one of data communication ports C1 to C3 assigned to the selected software.

When a control of the control section 4 is operated, the controller X generates operation data corresponding to the content of the operation in response to the operation. The generated operation data is sent to the conversion section H corresponding to any of the data communication ports C1 to C3 selected as a data communication port to be used. The conversion section H performs conversion of the operation data in accordance with the data conversion rule (protocol) being assigned thereto and sends the converted operation data to one of the data communication ports C1 to C3 that corresponds to the conversion section H. That is, the operation data is converted into data in a format suitable for the target software corresponding to the data communication ports C1 to C3 and then transmitted. Additionally, the software having received the converted operation data performs control tasks in response to the operation data.

As described above, since the conversion section converts the operation data generated in response to operation at the control section 4 in accordance with the data conversion rule (protocol), a plurality of specific controls constituting the control section 4 are individually able to function as a control for controlling each of the software. Thus, the controller X can be used as a remote controller capable of controlling a plurality of different types of software.

Figure 3:
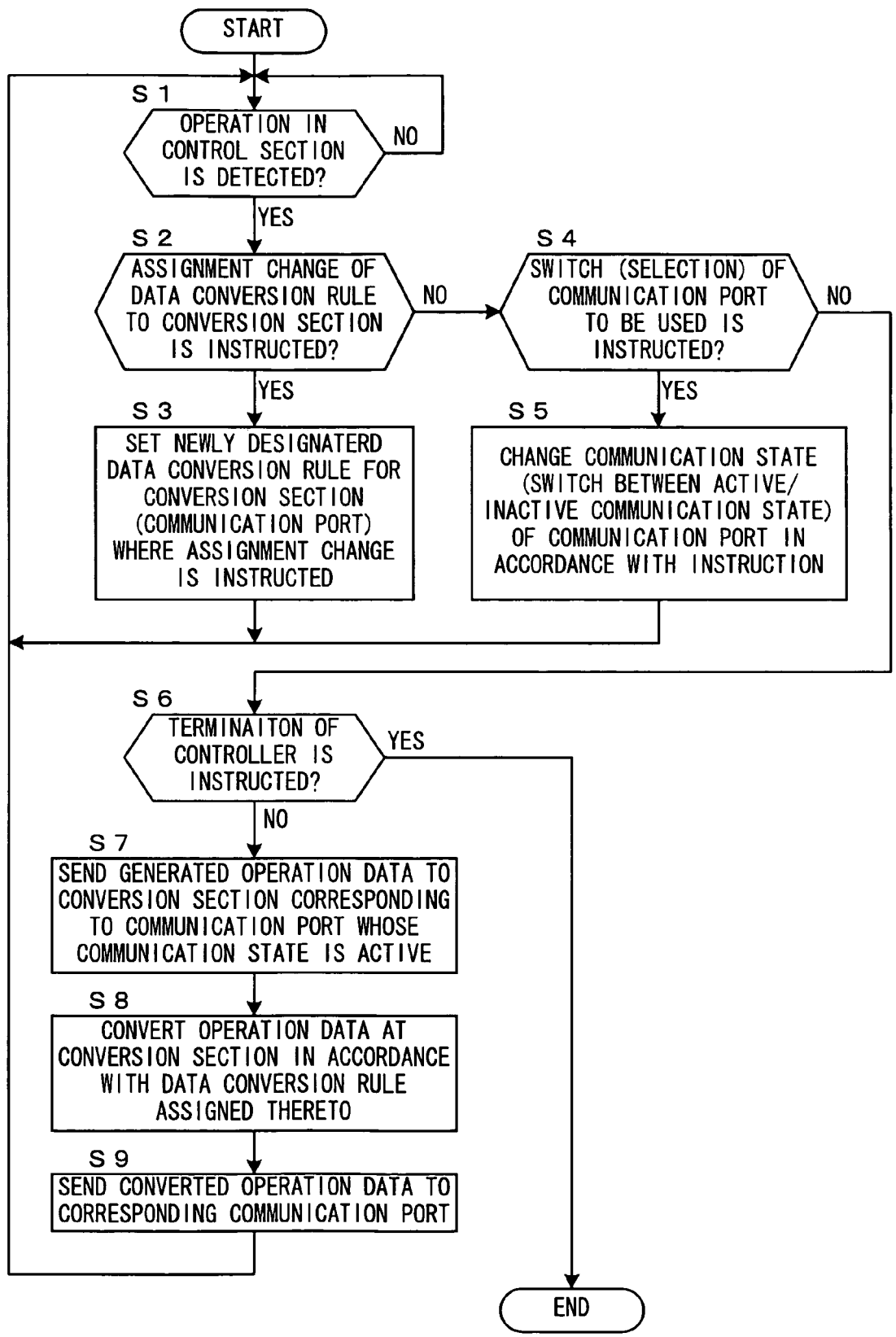
FIG. 3 is a flow chart to explain an example of "data conversion rule switching processing."

As described above, the controller X shown in FIG. 1 operates such that the data conversion rule corresponding to the software to be controlled is automatically determined on the side of the controller X in response to switching from one of the data communication ports C1 to C3 to another to be used, and in accordance with the determined data conversion rule, the operation data is converted into data in a format suitable for control of the target software, thereby performing control of the software. Then, "data conversion rule switching processing" for realizing such control will be explained with reference to FIG. 3. FIG. 3 is a flow chart illustrating an example of the "data conversion rule switching processing" executed by the CPU 1 shown in FIG. 1.

In step S1, it is determined whether any operation in the control section 4 is detected or not. When no operation in the control section 4 is detected (NO in step S1), it can be concluded that no operation is performed in the controller X and therefore respective processing described later (assignment of data conversion rules, selection of any of the data communication ports C1 to C3 to be used, remote control of target software, termination of control from the controller X) needs not to be performed. Thus, in this case, the process returns to step S1 for keeping the controller X waiting for operation until some operation is performed in the control section 4.

On the other hand, when some operation in the control section 4 is detected (YES in step S1), the processing corresponding to the detected operation is performed. That is, it is determined whether or not the operation performed in the control section 4 is an instruction to change assignment of the data conversion rule to the conversion section in response to operation of the protocol change switch (step S2), or an instruction to select any of the communication ports C1 to C3 to be used in response to operation of the communication port selection switch (step S4), and processing in accordance with the corresponding instruction is performed.

When the operation performed in the control section 4 is an instruction to change assignment of the data conversion rule (YES in step S2), a data conversion rule newly designated is set for the conversion section H (corresponding to the data communication port: refer to FIG. 2) about which the assignment change is instructed (step S3), and the process returns to step S1, keeping the controller X waiting for operation until next operation is performed. In this processing, the CPU 1 serves as setter.

The instruction to change assignment of the data conversion rule for setting (assigning) a data conversion rule for (to) the conversion section H is performed by selecting software which is to be connected and to be a control target from among the software being already activated on the side of the target device O for each of the plurality of data communication ports C1 to C3 to which the conversion sections H correspond, by operating protocol change switch. Selection of the data conversion rule at this time is performed using, for example, a software name previously given to each of the data conversion rules.

On the other hand, when the operation performed in the control section 4 is an instruction to select any of the communication ports C1 to C3 to be used (YES in step S4), communication state (i.e., active communication state or inactive communication state) of the data communication ports C1 to C3 whose communication state should be changed in accordance with the selection is changed (step S5), and the process returns to step S1, keeping the controller X waiting for operation until next operation is performed. In this processing, the CPU 1 serves as selector.

It should be noted that the method for changing communication states of the data communication ports C1 to C3 in step S5 may include either of the following methods: allowing only one of the data communication ports C1 to C3 to be in an active communication state (i.e., an exclusive method wherein when one of the data communication ports C1 to C3 is changed to the active communication state, the remainder of the data communication ports C1 to C3, which has been in active or inactive communication state, are automatically changed to the inactive communication state); and allowing two or more of the data communication ports C1 to C3 to be simultaneously in an active communication state (i.e., a method wherein the data communication ports C1 to C3 are independently changed to be in the active communication state or in the inactive communication state).

When the operation performed in the control section 4 is neither the above-stated instruction to change assignment of data conversion rule nor the instruction to select any of the data communication ports C1 to C3 (NO in both steps S2 and S4), it is determined whether or not an instruction to terminate the operation of the controller X in response to operation of the stop switch is conducted (step S6). When the instruction to terminate the operation of the controller X is conducted (YES in step S6), the "data conversion rule switching processing" is terminated.

On the other hand, when the instruction to terminate the operation of the controller X is not conducted (NO in step S6), the operation data generated in response to the operation of the control section 4 is sent to the conversion section(s) H corresponding to the data communication port(s) in an active communication state (step S7). In this processing, the CPU 1 serves as detector and other devices.

The conversion section H converts the operation data sent thereto in accordance with the data conversion rule assigned thereto (step S8). That is, the type of a parameter of the generated operation data is determined, the value of the parameter is determined, and the data format is changed into a format suitable for transmission, and so on. Then, the converted operation data is sent to the corresponding one of the data communication ports C1 to C3 (step S9). In those processing, the CPU 1 serves as converter in step S8 and as sender in step S9.

By adopting above described configuration and processing, controls which is similar to those in a case of directly operating a keyboard, a mouse, or the like provided with the target device O can be preformed by operating the control section 4 of the controller X, which controls are those such as adjustment of sound volume level, setting of mute, and the like for each of a plurality of software having been activated in the target device O. That is, a user needs not to be aware of switching between the data conversion rules (protocols). Further, the user can easily and automatically switch to data conversion rules suitable for software to be controlled and control respective software only by selecting communication ports C1 to C3 (selection of an external device to be controlled).

Furthermore, when a user simultaneously activates a plurality of software to be operated and operates them using the single controller X, the user needs only to switch between the software (data communication ports C1 to C3) to be operated, and therefore the user can quickly change the software to be operated, resulting in significant improvement in operability.

Moreover, a user can also simultaneously operate a plurality of types of devices with different protocols used to handle operation data. For example, the user can instruct a plurality of types of software to be operated, which are concurrently activated and use protocols different from one another, to change altogether the corresponding sound volume levels by the same magnitude, leading to significant improvement in operability.

It should be appreciated that although the above-described embodiment is described such that the data conversion rules (protocols) different from one another are assigned respectively to the plurality of data communication ports C1 to C3, the embodiment may be configured such that the same data conversion rule (protocol) can be assigned to two or more of the data communication ports C1 to C3. In such case, a plurality of the same programs can be activated in parallel in the target device O, and the data communication ports C1 to C3 can independently be determined for respective control programs being activated.

It should also be noted that when multiple conversion sections H are simultaneously used (i.e., when two or more of the data communication ports C1 to C3 are selected for use), the controller operates such that operation data generated in response to operation of a part of the control section 4 is converted into another format and then sent to all of the selected multiple data communication ports, and operation data generated in response to operation of the remainder of the control section 4 is not sent to any data communication port. When the controller is configured to operate as described above, it becomes possible to use only a part of the control section 4 as common controls to control the respective software. In this case, the part of the control section 4 can be used, for example, as a control for commonly controlling sound volume levels of all the selected target devices.

It should further be noted that although the above-described embodiment describes a data conversion rule switching device (controller X) wherein the control section 4 is provided within the controller X and the controller X respectively controls a plurality of target devices connected to the data communication ports, the invention is not limited to the embodiment. For example, the data conversion rule switching device could be configured such that the controls (control section) for generating operation data in response to operation thereof is externally connected to the switching device. In this case, the switching device provided between the controls and the target device O operates such that operation data generated in response to operation of the controls is converted into a format in accordance with a predetermined data conversion rule and the converted operation data is transmitted to the target device O via the data communication port. As described above, the data conversion rule switching device may be configured such that a plurality of target devices connected to the data communication ports can be respectively controlled using not only the control section 4 provided within the switching device but also controls provided outside the switching device and connected thereto.

As described above, according to the invention, the data conversion rules to be used are previously and individually assigned to the plurality of data communication ports to which the target devices are connected, and automatic switching of the data conversion rule from one to another that is suitable for use in the respective target devices can be performed by simply selecting the data communication ports to be used, thereby producing beneficial effects. That is, a user needs not to be aware of switching from one data conversion rule (protocol) to a desired data conversion rule (protocol) suitable for control of the target device and can easily control the respective target devices through a single controller while switching between the target devices connected to the respective data communication ports.

What is claimed is:

1. A system comprising a computer and a control device, wherein the computer executes a plurality of software and the control device connects to the computer, the control device comprising:

a control that generates operation data in response to operation of the control;

a plurality of data communication ports, each of which is assigned to one of said plurality of software executed on the computer and is a path for transferring the operation data to the computer to control a software assigned to a corresponding data communication port;

a protocol change switch:

a setter that sets a different protocol to each of the plurality of data communication ports by selecting, for each of the plurality of data communication ports, a software among said plurality of software executed on the computer in response to an operation to the protocol change switch by a user;

a port selector that selects one of the plurality of data communication ports;

a converter that converts the operation data in accordance with a protocol set to the selected data communication port; and a transmitter that transmits the converted operation data to the computer via the selected data communication port, thereby controlling the computer via the software to which the selected data communication port is assigned.

2. The system according to claim 1, wherein the computer is connected to the control device via a physical single cable, and transmission of converted operation data is performed via the cable.

3. A method of controlling a computer executing a plurality of software and connecting to a control device, the control device having a control and a plurality of data communication ports, said method comprising:

generating operation data in response to operation of the control;

assigning each of said plurality of communication ports to one of said plurality of software executed on the computer for transferring the operation data to the computer to control a software assigned to a corresponding data communication port;

setting a different protocol to each of the plurality of data communication ports by selecting, for each of the plurality of data communication ports, a software among said plurality of software executed on the computer in response to an operation to a protocol change switch by a user;

selecting one of the plurality of data communication ports;

converting the operation data in accordance with a protocol set to the selected data communication port; and transmitting the converted operation data to the computer via the selected data communication port, thereby controlling the computer via the software to which the selected data communication port is assigned.

4. A machine-readable medium containing program instructions executable by a control device for controlling a computer executing a plurality of software and connecting to the control device, the control device having a control and a plurality of data communication ports, said program instructions causing the control device to perform the following steps:

generating operation data in response to operation of the control;

assigning each of said plurality of communication ports to one of said plurality of software executed on the computer for transferring the operation data to the computer to control a software assigned to a corresponding data communication port;

setting a different protocol to each of the plurality of data communication ports by selecting, for each of the plurality of data communication ports, a software among said plurality of software executed on the computer in response to an operation to a protocol change switch by a user;

selecting one of the plurality of data communication ports;

converting the operation data in accordance with a protocol set to the selected data communication port; and transmitting the converted operation data to the computer via the selected data communication port, thereby controlling the computer via the software to which the selected data communication port is assigned.

* * * * *